US006843327B2

(12) United States Patent
Meixner et al.

(10) Patent No.: US 6,843,327 B2
(45) Date of Patent: Jan. 18, 2005

(54) MANUAL MACHINE TOOL

(75) Inventors: Gerhard Meixner, Filderstadt (DE); Oliver Zirn, Esslingen (DE); Egbert Schneider, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/297,142

(22) PCT Filed: Mar. 19, 2002

(86) PCT No.: PCT/DE02/00982

§ 371 (c)(1),
(2), (4) Date: Mar. 31, 2003

(87) PCT Pub. No.: WO02/081154

PCT Pub. Date: Oct. 17, 2002

(65) Prior Publication Data

US 2004/0003930 A1 Jan. 8, 2004

(30) Foreign Application Priority Data

Apr. 6, 2001 (DE) ........................................ 101 17 123

(51) Int. Cl.[7] .................................................. B23Q 5/08
(52) U.S. Cl. ............................ 173/11; 173/10; 173/176
(58) Field of Search ............................... 173/10, 11, 20, 173/21, 105, 112, 176; 175/296; 408/6, 124

(56) References Cited

U.S. PATENT DOCUMENTS 2,814,277 A * 11/1957 Jimerson .................... 173/176
3,458,793 A * 7/1969 Tsergas ...................... 388/820
4,222,443 A 9/1980 Chromy
4,699,223 A 10/1987 Noren
5,401,124 A * 3/1995 Hettich .......................... 408/6
5,672,922 A 9/1997 Raichle et al.
5,806,609 A 9/1998 Stoeck
5,879,111 A * 3/1999 Stock et al. ................... 408/6
5,914,882 A 6/1999 Yeghiazarians
6,209,659 B1 4/2001 Blessing

FOREIGN PATENT DOCUMENTS

DE 39 38 787 A1 5/1991
DE 43 34 933 A1 4/1995
EP 0 303 651 B2 12/1999

* cited by examiner

*Primary Examiner*—Eugene Kim
*Assistant Examiner*—Nathaniel Chukwurah
(74) *Attorney, Agent, or Firm*—Michael J. Striker

(57) ABSTRACT

The invention is based on a hand power tool, in particular a drill hammer and/or a chipping hammer, having a striking mechanism (14) capable of being driven in a housing (10) by an electric motor (12), via which an insertable tool (18) situated in a tool mount (16) is capable of being driven in an impacting manner, and having a sensor unit (30) via which a characteristic value for a no-load position can be detected.

It is proposed that, when a no-load position is detected via a motor control unit (22), the electric motor (12) and, therefore, the striking mechanism (14) can be actively decelerated.

11 Claims, 1 Drawing Sheet

MANUAL MACHINE TOOL

BACKGROUND OF THE INVENTION

The invention is based generally on a hand power tool, in particular a hammer drill or rotary hammer.

A hand power tool is made known in EP 0 303 651 B2, a drill hammer, in fact, having a striking mechanism capable of being driven by an electric motor, in the case of which a clutch located in the drive train disengages automatically when a specified quantity of motion detected by a sensor is reached, in fact, to interrupt a striking-driving action being performed by the striking mechanism in a no-load position. A travel position of a striking mechanism part or an insertable tool located in a no-load path is detected as the quantity of motion. When this travel position is left, the clutch automatically engages once more. When this travel position is reached, the sensor activates a control device that sends a control impulse to an electromagnetic disengage-control drive that grips the clutch and disengages it.

SUMMARY OF THE INVENTION

The invention is based on a hand power tool, in particular a drill hammer and/or a chipping hammer, having a striking mechanism capable of being driven by an electric motor in a housing, via which an insertable tool situated in a tool mount is capable of being driven in an impacting manner, and having a sensor unit, via which a characteristic value for a no-load position can be detected.

It is proposed that, when a no-load position is detected via a motor control unit, the electric motor and, therefore, the striking mechanism can be actively decelerated. An additional idle clutch and a safety stop for a hammer can be avoided, and additional components, weight, installation space, installation expense, and costs can be spared. Problems with wear on an additional idle clutch can be prevented. A short no-load path can be achieved with a simple design and, as a result, a short design of the hand power tool and low wear on the tool mount can be obtained.

Moreover, a high level of comfort can be achieved, particularly by completely eliminating an idle spring, e.g., by using a pressure sensor to determine a contact pressure of the insertable tool against an object to be worked, or by designing an idle spring at least lightweight and with a small positioning force, so that, advantageously, a small operating force is enough to reach a working position.

Advantageously, the striking mechanism can be designed exclusively in terms of its impact function, and a no-load function can remain unconsidered. This results in design freedom. The striking mechanism can be engineered to be robust by eliminating no-load holes and air vents, and an advantageous seal to prevent contamination and loss of lubricant can be obtained.

A tailored and rapid run-up of the striking mechanism from the no-load position can be realized, and the transient behavior can be matched to the striking mechanism using simple engineering by means of an appropriate operation of the electric motor. The means of attaining the object, according to the invention, can basically be used with all hand power tools, the insertable tools of which are capable of being driven in an impacting manner, as is the case, in particular, with impact drills, drill hammers, chipping hammers, etc.

In principle, all electric motors appearing suitable to one skilled in the art—such as asynchronous motors, synchronous motors, or DC devices, etc., for example—can be actively decelerated via a special motor control unit, via a brake control. Particularly advantageously, the electric motor is formed by an electronically commutated motor, however. Brushless, electronically commutated motors—reluctance motors, in particular—are particularly overload-tolerant and can be loaded for short durations with a high level of torque and, therefore, a high level of braking torque. A high amount of current can flow without the risk of brush sparking.

Furthermore, an armature of the electronically commutated electric motor can be designed having an overall smaller mass due to the absence of an armature winding as compared with an armature of a conventional electric motor having an armature winding. As a result, the armature of the electronically commutated electric motor stores a small amount of rotational energy during operation and can be decelerated rapidly using little energy. The electronically commutated electric motor can be advantageously decelerated with a large intermediate-circuit capacitor or with a brake chopper in a brake circuit.

If the striking mechanism is capable of being decelerated with a separate brake unit, the active braking of the electric motor can be supported and a standstill of the electric motor and the striking mechanism can be achieved particularly rapidly. The separate brake unit can be designed in various ways, e.g., it can be formed by a mechanical unit or an electromechanical unit, etc.

Particularly advantageously, a drive piston of the striking mechanism is decelerated to a standstill between 0.1 to 3 impact strokes of the striking mechanism after the no-load position is detected. This reduces wear on the striking mechanism and increases comfort, in particular by preventing unnecessary vibrations.

If the striking mechanism comprises a pot-type piston, a cost-effective piston can be obtained, in the case of which a hammer and the piston are capable of being interconnected by means of friction. Due to the direct contact between the pot-type piston and the hammer, the hammer can be accelerated advantageously in a short time during transition from a no-load position to a working position via the pot-type piston and, with the means of attaining the object according to the invention, it can be slowed in a short time during transition from a working position to a no-load position by means of the active deceleration of the electric motor. In principle, however, the means of attaining the object according to the invention can also be used with striking mechanisms that comprise a piston guided in a cylinder or a hammer tube.

If a motor control unit is designed at least partially integral with an already-present power control unit of the electric motor, then components, installation space, and weight can be advantageously spared. In the case of electronically commutated motors in particular, the motor control unit can easily be designed integral with a power control unit of the electric motor.

The sensor unit can comprise various sensors appearing suitable to one skilled in the art, e.g., electronic, electromechanical, and/or mechanical sensors, via which, however, it should be possible to detect a contact pressure of the insertable tool against an object to be worked, and/or a travel position of the insertable tool, or a component moved with the insertable tool, however. Particularly advantageously, the sensor unit comprises at least one electronic sensor. Said electronic sensor is small and easy to design and integrate—particularly advantageously—in space-saving fashion in small hand power tools. The information from the sensor to the motor control unit can be transmitted via electric lines, via radio, optically and/or mechanically, etc.

BRIEF DESCRIPTION OF THE DRAWINGS

Further advantages result from the following description of the drawing. An exemplary embodiment of the invention is shown in the drawing. The drawing, the description, and the claims contain numerous features in combination. One skilled in the art will advantageously consider them individually as well and combine them into reasonable further combinations.

DETAILED DESCRIPTION OF THE PREFERRED EMBODIMENTS

Figure 1:
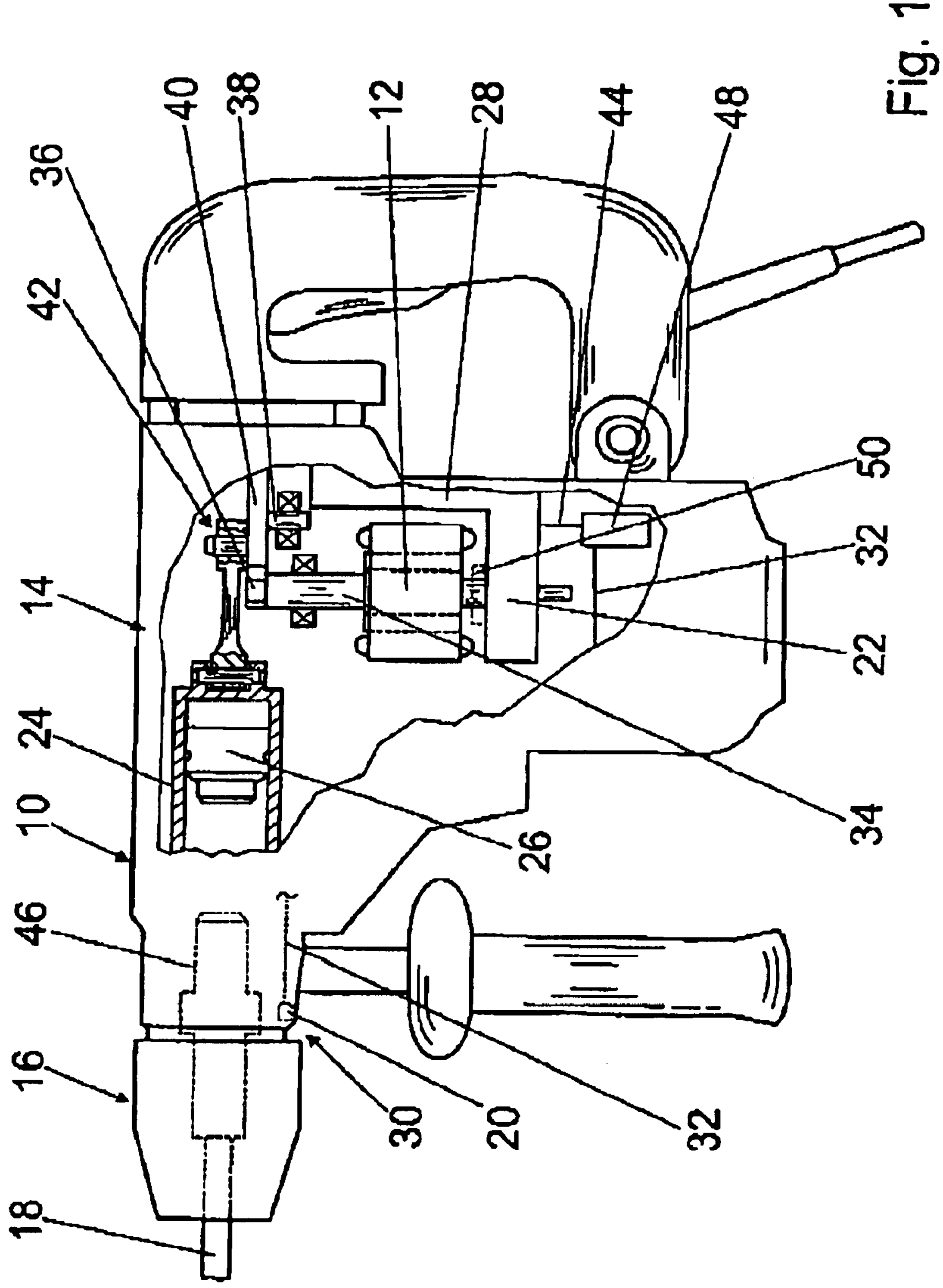

FIG. 1 shows a schematic representation of a partial cross-section through a drill hammer having a striking mechanism 14 capable of being driven in a housing 10 by an electric motor 12, whereby the electric motor 12 is formed by an electrically commutated motor.

A pinion 36 is formed on an end of a shaft 34 of the electric motor 12 facing an axis of rotation an insertable tool 18, which said pinion meshes with a spur gear 40 supported on a bearing bolt 38. An eccentric pin 42 is fastened to the spur gear 40, via which a pot-type piston 24 of the striking mechanism 14 can be driven. A hammer 26 is displaceably supported in the pot-type piston 24, which said hammer acts via a punch dolly 46 on the insertable tool 18 secured in a tool mount 16 and on a drill bit secured in the tool mount 16.

Furthermore, the drill hammer comprises a sensor unit 30 having an electronic sensor 20 via which a characteristic value for a no-load position can be detected.

According to the invention, when a no-load position is detected, the electric motor 12 and, therefore, the striking mechanism 14, can be actively decelerated via a motor control unit 22, whereby the motor control unit 22 is designed largely integral with an already-present power control unit 28 of the electric motor 12.

If the insertable tool 18 capable of being driven in an impacting manner by the electric motor 12 via the eccentric pin 42, the pot-type piston 24, the hammer 26, and the drill bit 46 is relieved by an object to be worked, a not-further-shown idle spring presses the drill bit 46—which is actively interconnected with the insertable tool 18 and is axially displaceably supported in the tool mount 16—axially into a home position in the direction of the object to be worked. The electronic sensor 20 of the sensor unit 30 installed in the housing in the region of the tool mount 16 detects a no-load position or a travel position of the drill bit 46 associated with the no-load position and sends a signal via a signal line 32 to an evaluation unit 48 which, in turn, forwards a pulse via a signal line 44 to the motor control unit 22.

The motor control unit 22 triggers an active braking of the electric motor 12 in such a manner, in face, that electromagnetically generated forces of the electric motor 12 act against the rotational direction of the shaft 34, and, after the no-load position is detected, the pot-type piston 24 of the striking mechanism 14 comes to a standstill after approximately one impact stroke. The electric motor 12 also could be decelerated by a separate braking unit 50, shown schematically FIG. 1.

If the insertable tool 18 is again pressed against an object to be worked and the drill bit 46 is pushed out of the no-load position into its working position, the electronic sensor 20 sends a signal via the signal line 32 to the evaluation unit 48 and this, in turn, sends a signal via the signal line 44 to the motor control unit 22, which triggers a tailored run-up of the electric motor 12 matched to the striking mechanism 14 that is present.

| Reference Numerals | |
|---|---|
| 10 | Housing |
| 12 | Electric motor |
| 14 | Striking mechanism |
| 16 | Tool mount |
| 18 | Insertable tool |
| 20 | Sensor |
| 22 | Motor control unit |
| 24 | Drive piston |
| 26 | Hammer |
| 28 | Power control unit |
| 30 | Sensor unit |
| 32 | Signal line |
| 34 | Shaft |
| 36 | Pinion |
| 38 | Bearing bolt |
| 40 | Spur gear |
| 42 | Eccentric pin |
| 44 | Signal line |
| 46 | Drill bit |
| 48 | Evaluation unit |

What is claimed is:

1. A hand power tool, comprising:

a striking mechanism (14) arranged in a housing (10) and with an electric motor (12), wherein the electric motor (12) serves to drive the striking mechanism, wherein the striking mechanism serves to drive an insertable tool (18) situated in a tool mount (16) in an impacting manner; and a sensor unit (30), wherein said sensor unit serves to detect a characteristic value for a no-load position of the insertable tool; and an electric motor control unit (22), wherein the electric motor control unit serves to actively decelerate the electric motor (12) and therefore the striking mechanism (14) when a no-load position is detected.

2. The hand power tool according to claim 1, wherein the electric motor (12) is formed by a brushless, electronically commutated motor.

3. The hand power tool according to claim 1, wherein a drive piston (24) of the striking mechanism (14) is decelerated to a standstill after the no-load position is detected between 0.1 and 3 impact strokes of the striking mechanism (14).

4. The hand power tool according to claim 1, further comprising a separate braking unit, wherein said separate braking unit serves to decelerate the striking mechanism (14).

5. The hand power tool according to claim 1, wherein the striking mechanism (14) comprises a drive piston (24) formed by a pot-type piston.

6. The hand power tool according to claim 1, wherein the electric motor control unit (22) is designed at least partially integral with an already-present power control unit (28) of the electric motor (12).

7. The hand power tool according to claim 1, wherein the sensor unit (30) comprises at least one electronic sensor (20).

8. The hand power tool according to claim 1, wherein the electric motor control unit (22) controls the electric motor (12) upon active deceleration in a manner such that electromagnetically produced forces of the electric motor (12) act against a rotational direction of a shaft (34) of the electric motor (12).

9. The hand power tool according to claim 1, wherein the electric motor (12) has an armature without an armature winding.

10. The hand power tool according to claim 1, wherein the hand power tool is a drill hammer.

11. The hand power tool according to claim 1, wherein the hand power tool is a rotary hammer.

* * * * *